May 28, 1968 S. LETVIN 3,385,030
PROCESS FOR SCRUBBING A GAS STREAM CONTAINING
PARTICULATE MATERIAL
Filed Sept. 28, 1966 2 Sheets-Sheet 2
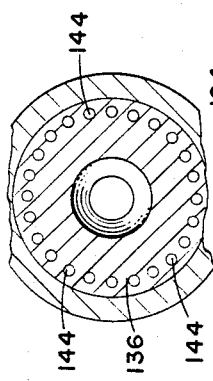
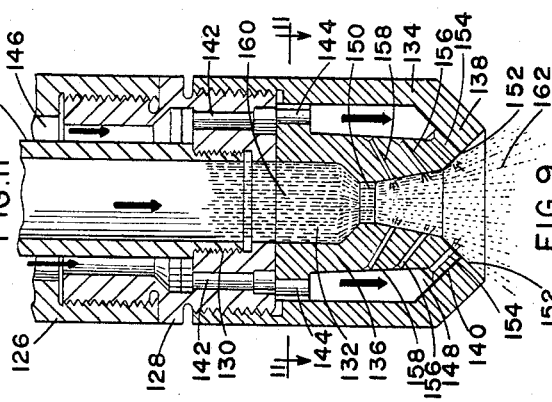
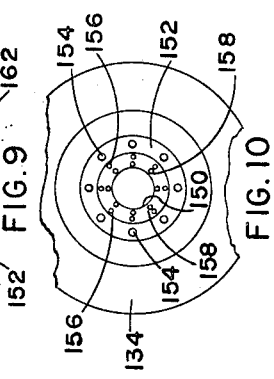
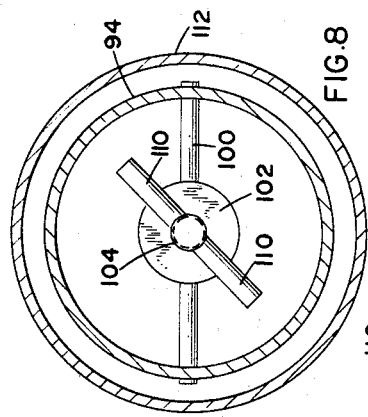
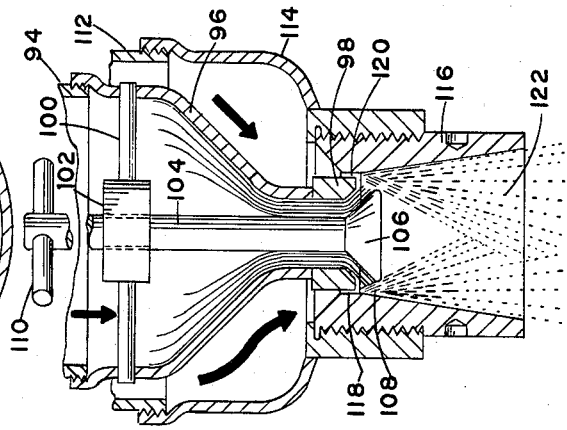
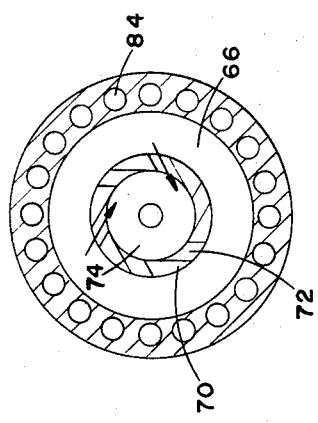
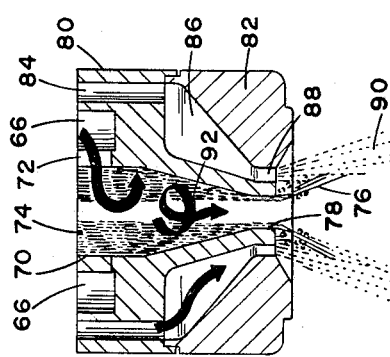
INVENTOR
SAMUEL LETVIN
BY
ATTORNEY United States Patent Office 3,385,030
Patented May 28, 1968

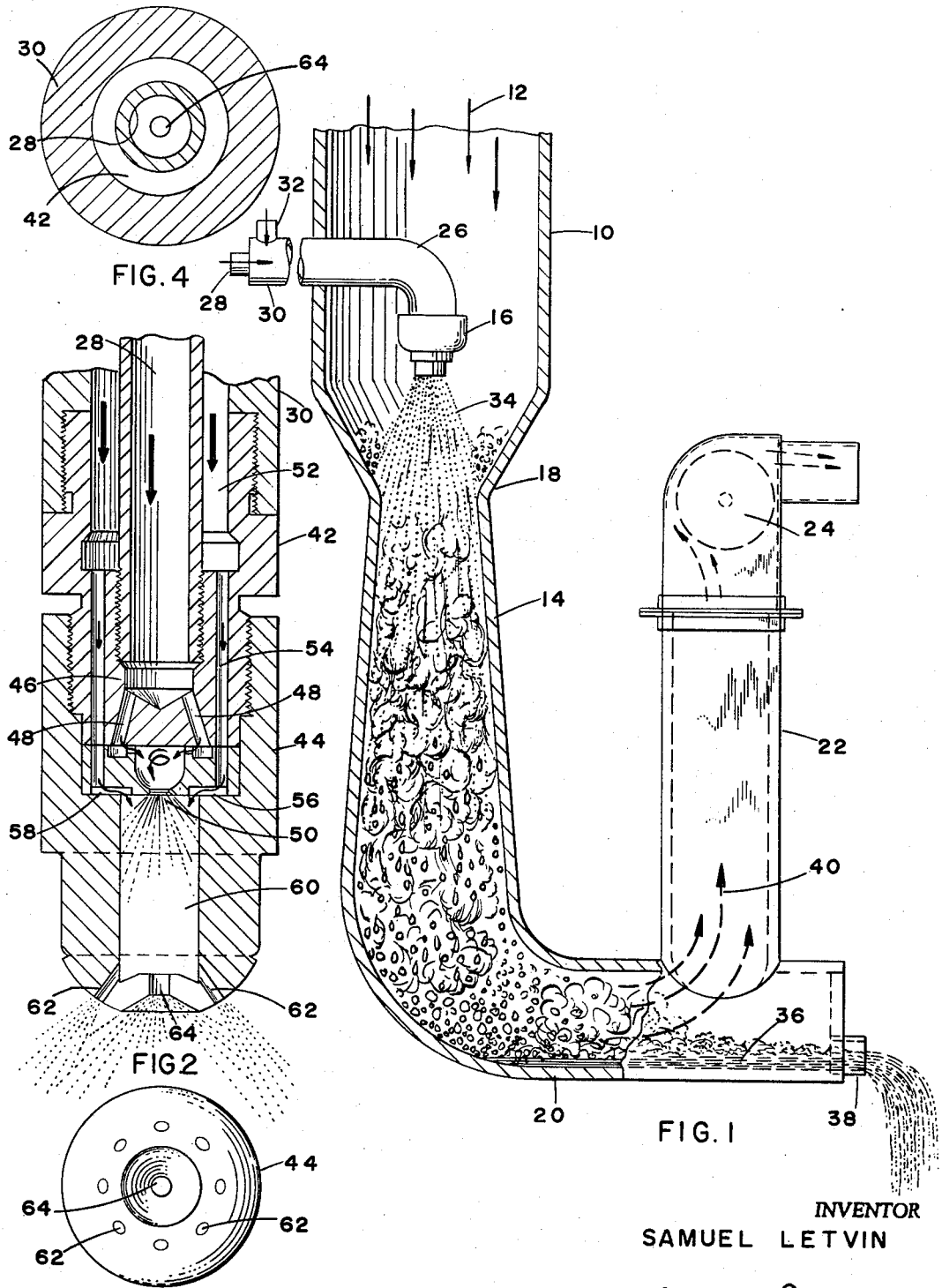

3,385,030
PROCESS FOR SCRUBBING A GAS STREAM
CONTAINING PARTICULATE MATERIAL
Samuel Letvin, York, Pa., assignor to Fabricating Engineering Company, Inc., York, Pa., a corporation of Pennsylvania
Filed Sept. 28, 1966, Ser. No. 582,752
5 Claims. (Cl. 55—90)

ABSTRACT OF THE DISCLOSURE

A process to scrub contaminated gases containing a substantial percentage of solid particulate material of micron and sub-micron size and remove the same therefrom by producing a spray of finely divided liquid particles of which the major portion do not exceed approximately micron size and discharging the same at a high velocity into a stream of said contaminated gases to greatly accelerate the velocity thereof and substantially saturate the path of movement of said stream of gases while producing substantial turbulence and thereby form small globules of said liquid particles around said solid particles which serve as nuclei therefor, and impinging said droplets against a smoothly curved surface to agglomerate said solid particles into a concentrated fluid stream thereof which is flowed away from the cleaned gas stream to separate the contaminating material therefrom, and withdrawing said cleaned gas stream along a desired path.

---

This invention pertains to a gas scrubbing process and, more particularly, to a gas scrubber capable of removing substantially all size ranges of contaminating particulate matter from air or gas streams.

Particularly for purposes of cleaning industrial types of gases before discharging the same into the atmosphere from certain types of industrial and commercial enterprises, many types of scrubbing and cleaning devices have been devised heretofore. Almost innumerable types of industrial processes presently utilized result in the discharge of contaminating particulate matter from plant equipment into the atmosphere with the result that many industrial areas are plagued with highly contaminated air. Not only is atmospheric air contaminated in this manner however, but it is desirable in certain industrial procedures to remove from air and gases particulate matter prior to passing the air or gases to subsequent steps in further processing, particularly those of a chemical nature.

In general, the more common wet collector types of air or gas scrubbing devices which have been devised heretofore have been predicated upon the principle of discharging liquid and particularly water sprays into a stream of the contaminated air or gas, on the theory that the liquid spray will wet and entrain the particulate matter in the contaminated air or gas stream, and flush the same from the stream. In general, relatively large volumes of spray water as well as other forms of washing liquid, normally are required to accomplish such decontaminating processes. Notwithstanding the use of substantial volumes of washing liquids however, it nevertheless has been found to be exceedingly difficult to remove excessively fine particulate matter, such as of the order of a few microns or less than one micron in size. Accordingly, in addition to conventional so-called wet collector gas washers and special types of gas washers, more exotic types of decontaminating devices have been devised in recent years, including electrostatic precipitators, and even more recently, sonic agglomerators have been devised for gas purifying operations. Electrostatic precipitators are capable of dealing with particulate matter of micron and even sub-micron size with reasonable satisfaction under favorable conditions, such as suitable moisture content. Further, the equipment is initially high in cost and operation thereof likewise is quite costly.

Among the types of industrial material which tend to contaminate atmospheric air in substantial degrees are dust from cement plants, rock treating or crushing plants, foundry operations, stoker fly ash, various types of ore treating equipment, many types of chemical exhausts discharged from chemical manufacturing processes, and numerous types of metallurgical operations. Perhaps one of the most common sources of atmosphere contamination results however from smoke and particulate matter discharged from stacks of numerous types of industrial plants and this type of contaminating material frequently presents one of the most difficult problems to solve with respect to removing it from a flue before discharge thereof because of the very fine nature of the contaminating particles in the smoke stream. It is especially this size of contaminating particles that existing air and gas scrubbers are much less efficient in handling than in regard to contaminating particulate matter of larger size, especially when relying upon water and other forms of liquid spray to entrain and thus remove the contaminating particulate matter from the stream of gas by liquid scrubbing thereof before discharge into the atmosphere.

It is the principal object of the present invention to provide a gas scrubber of a highly efficient and effective nature capable of removing substantially all size ranges of contaminating particulate material from as large a volume of contaminated air or gas as possible by utilizing a minimum amount of washing liquid which is atomized by a minimum amount of air or vapor which is introduced under high pressure to effect maximum atomizing of said washing liquid to finest fog-like particle size, down to sub-micron size, to provide maximum acceleration of said liquid fog-like particles, which acceleration is transmitted to said maximum volumes of incoming contaminated air or gas incident to purifying the same and thereby also similarly accelerating movement of the same through said purifying apparatus.

It is another object of the invention to provide both a process and a number of embodiments of structure by which the process may be performed for accomplishing the above-described scrubbing of contaminated air and other types of gas streams.

A further object of the invention is to utilize the scrubbing process and apparatus as pump means to induce flow of contaminated air and other types of gases along a predetermined confined path incident to being subjected to scrubbing and cleaning thereof.

Still another object of the invention is to employ spray means of which a number of different types are provided, these respectively being capable of utilizing a relatively small quantity of water or similar liquid in relation to a supply of high velocity atomizing air, vapor or other gas which impinges against currents or streams of said liquid in shearing or equivalent decimating relationship simultaneously to produce a very finely divided fog-like atmosphere of liquid particles moving at very high velocity and in sufficient volume to substantially completely saturate with suitable density the entire cross-section of the path along which contaminated gases, including air, are moving for purposes of being scrubbed to remove substantially all size ranges of contaminating particulate matter therefrom, the velocity of the finely divided liquid particles, rather than the size and mass thereof, primarily being relied upon to effect the formation of water droplets of various sizes surrounding and thereby encompassing all of the particles of contaminating material, regardless of size, and also create turbulence in said stream to facilitate such function, whereby very substantial economy of the use of washing liquid is effected in contrast to presently used procedures.

Still further objects of the invention are to use various embodiments of nozzle structures to effect such atomizing of the spray liquids, including water, into such very finely divided, fog-like sub-micron particle size ranges and simultaneously greatly accelerate the speed at which said water particles and droplets are introduced into the gas stream which requires scrubbing.

Details of the invention and of the foregoing objects, as well as other objects thereof, are set forth in the following specification and illustrated in the accompanying drawings comprising a part thereof.

In the drawings:

FIG. 1 is a fragmentary vertical section of an exemplary gas scrubber embodying the principles of the present invention.

FIG. 2 is a fragmentary vertical section of one embodiment of spray nozzle capable of being used in the exemplary scrubber illustrated in FIG. 1.

FIG. 3 is a bottom plan view of the embodiment of nozzle structure shown in FIG. 2.

FIG. 4 is a top plan view of the embodiment of nozzle structure shown in FIG. 2.

FIGS. 5 and 6 respectively are fragmentary vertical section and top plan views of another embodiment of nozzle structure capable of being used in the exemplary embodiment of scrubber shown in FIG. 1.

FIGS. 7 and 8 respectively are fragmentary vertical section and top plan views of a still further embodiment of nozzle structure capable of being employed in the exemplary scrubber mechanism shown in FIG. 1, the vertical sectional view of FIG. 7 being partly broken away to foreshorten the same.

FIGS. 9, 10 and 11 respectively are a fragmentary vertical section, fragmentary bottom plan, and cross-sectional views of one further embodiment of nozzle structure capable of being utilized in the exemplary scrubbing mechanism illustrated in FIG. 1, FIG. 11 being taken on line 11—11 of FIG. 9.

As has been indicated hereinabove, many types of wet collector gas washers and scrubbers have been devised heretofore, most of which rely upon one or more spray heads or nozzles. Relatively substantial quantities of water or similar washing liquids are relied upon to wet and tend to wash out the solid particles of contaminating material in a gas stream while subjected to such spray discharge. As further indicated above, particularly for the removal of very fine sizes of contaminating particulate matter, it is difficult to achieve such removal by the use of such commonly employed type of spray heads or nozzles.

In accordance with the principles of the present invention, it has been found that a highly effective process for scrubbing, and thereby cleansing, gases contaminated with various sizes ranges of particulate matter, may be effected through the use of an exemplary structure of the type shown in FIG. 1 wherein contaminated gases are moved through an inlet conduit 10 of appropriate size, depending upon the volume of gases to be washed, and the pressure at which said contaminated gases, which are represented by the arrows 12 in FIG. 1, travel through said conduit 10 is not critical as far as the present invention is concerned. The inlet conduit 10 connects to the inlet end of an elongated scrubbing compartment 14 which, in FIG. 1 is illustrated as being substantially vertical but it is to be understood that the present invention is not restricted to the scrubbing compartment being vertically arranged.

Depending upon the volume of contaminating gas 12 which is to be scrubbed in relation to the washing or scrubbing spray produced by the exemplary nozzle 16, the entrance end of the scrubbing compartment 14 may be constricted as shown at 18 and the walls of the compartment also may be gradually flared outwardly toward the discharge portion 20 which directly communicates with the exit end of the compartment 14. Particularly if the compartment 14 is arranged vertically, the discharge portion 20 preferably extends laterally therefrom and an exit conduit 22 for cleaned or decontaminated gases extends upwardly from the discharge portion 20. Such discharge of cleaned gases may be facilitated by the use of a pump or blower 24, if desired to overcome friction losses in the system.

The spray nozzle 16 comprises the discharge end of a compound inlet conduit 26 provided with means separately to conduct liquid such as water, and gas such as air, or vapor, such as steam simultaneously to the nozzle. For example, an interior conduit 28 has a smaller diameter and is mounted coaxially within the exterior conduit 30. By means of an inlet 32 which is connected to a source of liquid, such as water, such liquid is delivered to the nozzle 16 within the space between the interior of exterior conduit 30 and the interior conduit 28. Similarly, the outer end of interior conduit 28 is connectable to a source of gas, such as air, or vapor, such as steam, preferably under relatively high pressure. It also will be understood that appropriate control valves are installed in the lines leading to the conduits 28 and 32 respectively to control the flow of gas and liquid therethrough in order that the desired supply thereof may be delivered to the nozzle 16 for purposes of generating the high velocity, very finely atomized, fog-like spray stream 34.

The spray stream 34 serves two principal functions. The most important of these is to completely saturate with suitable density the entire cross-section of the interior of the scrubbing compartment 14 so as substantially to saturate the stream of contaminated gas 12 which passes therethrough, whereby all the particles of contaminating material entrained within the incoming gas 12 will form nuclei upon which the fog-like liquid or vapor particles produced by the nozzle 16 are adsorbed to form liquid droplets. The second function is to greatly accelerate the speed of the contaminated gas stream within the scrubbing compartment 14 and create turbulence therein. By greatly accelerating the speed of said fog-like vapor particles, the gas within the compartment 14 as well as the contaminating particles therein will be similarly accelerated and this also causes turbulence and diffusion of the particulate matter which promotes the adsorption of the finely divided liquid particles or vapor upon the contaminating particles which serve as nuclei for the formation of droplets of liquid. Such droplets move at substantial velocity toward the discharge portion 20 which extends, preferably, somewhat transversely to the path of movement of the material moving longitudinally through the scrubbing compartment 14.

By extending the discharge portion 20 of compartment 14 transversely thereto, abrupt imprignement of the droplets of liquid referred to above, which contain the nuclei of contaminating particles, against the walls of portion 20, results in agglomeration of said liquid droplets which condenses and transforms said ripidly moving droplets into a liquid stream 36 of concentrated contaminating particulate matter representing a substantial proportion of said liquid stream. If desired, suitable additional baffle means may be employed to facilitate such agglomeration. Said stream 36 is directed through a suitable exit 38 for discharge to waste. Prior to such final discharge to waste however, the material may be subjected to settling means such as a basin or tank, or other suitable clarifying means in order that primarily only concentrated sludge or waste particulate matter may be discharged to waste.

It thus will be seen that the formation of droplets, which is somewhat diagrammatically illustrated in exemplary manner in FIG. 1, near the discharge end 20 of compartment 14, and the impingement of the droplets which are laden with particulate matter, against the lower well thereof to agglomerate the same for ready discharge affords a simple but highly effective method to produce substantially purified gas, represented by the arrows 40, from which substantially all contaminating particulate matter has been removed. The purified gas may be withdrawn through the exemplary conduit 22 by means of blower 24 or otherwise, following which the cleansed gas may be discharged to atmosphere or elsewhere. Under certain circumstances, it may be necessary to employ limited condensing means within conduit 22 to insure a desired dryness in the discharged gas product.

The details of the nozzle 16 may be in the form of a number of different embodiments, four different examples of which are illustrated in detail in the drawings. Referring to FIG. 2, a fragmentary and large vertical sectional illustration of one embodiment is shown in which the exterior conduit 30 has a nipple 42 of special construction threaded into the lower end thereof, the outer end of the nipple having a nozzle cap 44 threaded thereon.

The terminal end of the interior conduit 28, as shown in FIG. 2, has a liquid diffusor 46 threadably connected thereto, the same having a plurality of downwardly and outwardly directed ports 48 extending between the lower end of conduit 28 and a central exit 50 for the liquid. It also will be seen from FIG. 2 that the lower ends of the downwardly and outwardly extending ports 48 are directed laterally toward each other and in such a manner as to produce a forced vortex to the liquid prior to discharging through the central exit 50, thereby inducing a relatively wide angled, flaring discharge of the liquid as shown in diagrammatic manner in FIG. 2.

Such discharging liquid is intercepted by an annular column of gas or vapor moving at high velocity through the annular space 52 within nipple 42 which directly communicates with a series of parallel, circumferentially spaced elongated holes 54 that terminate in an inwardly extending annular space 56 defined by the lower end of diffusor 46 and a transverse shoulder 58 extending between the inner wall of the upper portion of nozzle cap 44 and the lower outlet passage 60 within the lower end of nozzle cap 44. Said passage 60 is of substantially large diameter compared to the holes 54 to permit initial expansion and mixture of the gas or vapor and water to form a spray stream and terminates at its lower end in a series of downwardly and outwardly directed discharge orifices 62 and a central discharge port 64 which provide ultimate atomizing of the spray stream.

As the discharging liquid flared outwardly while it is discharged from the central exit 50 within lower outlet passage 60, it is shearingly impinged by the discharging gas, such as air, which is exiting at high pressure through the annular space 56 generally in the direction indicated by the arrows shown in FIG. 2. Such direct, abrupt and rapid impingement of the discharging gas or vapor relative to the liquid instantly causes a very fine atomizing of the liquid into very fine, fog-like liquid or vapor particles down to sub-micron size ranges which, because of the continuing velocity of the gas-liquid mixture, likewise are accelerated to very high velocity through outlet passage 60 for final discharge at even higher velocity through the discharge ports 62 and 64 into the interior of scrubbing compartment 14. This is because the total cross-section of ports 62 and 64 is less than that of passage 60. It thus will be seen that the nozzle shown in FIG. 2 is of the type in which atomizing of the liquid occurs internally.

In the embodiment of nozzle shown principally in FIG. 2, as well as in the additional embodiments described hereinafter, it is to be noted that said nozzles are of the type which primarily are designed to utilize a relatively small proportion of liquid, such as water, and a similarly small volume of gas, such as air or vapor which is caused to impinge at high pressure and correspondingly high velocity against discharging streams of said liquid to atomize the same. This results in minimizing the consumption of liquid and atomizing media for scrubbing purposes, as distinguished particularly from the corresponding volumes of liquid such as water, which normally are utilized in conventional wet collector type scrubbing mechanisms. By way of specific example, but without restriction thereto, liquid, such as water, is atomized, for example, at a rate of less than about 15% the weight of gas or vapor which is discharged against said liquid to shearingly impinge against the same and atomize it.

In contrast to average, normal consumption of liquid, such as water, used in conventional gas scrubbers, nozzles of the type used in the present invention have been tested effectively while consuming approximately 2½ gallons of water per 2500 c.f.m. of incoming contaminated gas which is to be scrubbed, whereas conventional liquid scrubbers consume from between 25 and 30 times that quantity of liquid, such as water, for similar volumes of gas. The spray particles or droplets of minute size discharged from the spray nozzle 16 have a velocity as high as between 30,000 and 50,000 feet per minute. This velocity is produced entirely by the high pressure at which the relatively small proportion of atomizing gas or vapor is delivered to the nozzle. Thus, velocity, rather than quantity of spray, is the factor which results in a type of atomization which produces high entrainment of even very minute contaminating particulate material within the spray. Such spray velocity immediately accelerates the incoming contaminated gas stream as high as 20,000 feet per minute. Turbulence and diffusion also is produced therein which enhances such entrainment.

Futher in contrast to the foregoing phenomenon, conventional liquid scrubbers for contaminated gas substantially drown the gas being washed with liquid spray particles of far greater size than those employed in regard to the present invention, yet with the far less efficiency in removing contaminating particles, and especially the finer size ranges thereof, than is possible with the present invention.

Additional embodiments of nozzles respectively shown in FIGS. 5–11 now will be described in detail. Referring to FIGS. 5 and 6, a second embodiment of nozzle is illustrated in which the interior conduit 28 shown in FIG. 1 is suitably connected to an annular liquid conduit 66 shown in FIG. 5. An inner cylindrical wall 70, as best shown in FIG. 6, has a plurality of circumferentially spaced, tangentially directed discharge ports 72 therein which communicate with a central discharge chamber 74 which tapers inwardly and downwardly towards its discharge end, as shown in FIG. 5. The water discharging through ports 72 forms a forced vortex in chamber 74 which results in a rotating tubular stream terminating in a relatively thin wall of liquid 76 at the discharge orifice 78. Said discharging wall of liquid commences to atomize as soon as it leaves the confines of orifice 78.

Surrounding the exterior of liquid conduit 66 in the nozzle shown in FIGS. 5 and 6 is an outer jacket or conduit 30 which is a continuation of the exterior conduit 30 shown in FIG. 1 and is connected thereto, conduit 80 having a terminal discharge nozzle 82 connected thereto. A series of elongated holes 84 conduct gas or vapor under high pressure into the outer, somewhat conical space 86 which terminates in an annular discharge opening 88 surrounding the lower end of the liquid discharge orifice 78. It thus will be seen that the air discharging from annular opening 88 directly and shearingly impinges and decimates the discharging stream of partially atomized liquid 76 exiting from orifice 78, thereby completing the atomizing of the same into very fine particle size ranges and tremenduously accelerating such atomized liquid particles comprising the discharge stream 90.

Considering next the embodiment of nozzle shown in FIGS. 7 and 8, an inner sleeve 94 is suitably connected to the interior conduit 28 shown in FIG 2 for example, for furnishing liquid, such as water to the nozzle. Removably connected to the lower end of sleeve 92 is an inwardly and downwardly extending constricting member 96, the lower end 98 thereof defining a discharge opening. Extending across the upper end of member 96 is a bar 100 having an internally threaded boss 102 midway thereof which threadably receives a shaft 104 which is coaxial with member 96 and terminates at its lower end in a downwardly and outwardly extending head 106.

The outer periphery of head 106 is complementary with and radially spaced from the lower end of discharge opening 98 in member 96 to define an outwardly and downwardly extending annular discharge passage 108 for liquid exiting from inner sleeve 94. The capacity of the discharge passage 108 may be varied by rotating shaft 104 relative to boss 102, upwardly or downwardly. To facilitate such rotation, a transversely extending pin 110 is provided in the upper end of shaft 104 for manual actuation which may be achieved when the restricting member 96 is removed from the lower end of sleeve 94.

Coaxially surrounding inner sleeve 94 is an outer sleeve 112 which has a terminal nozzle member 114 threadably or otherwise removably connected thereto. Preferably, a nozzle insert 116 is threadably connecetd to the lower end of member 114 as clearly shown in FIG. 7. The interior of insert 114 is bored so as to provide adjacent its upper end a discharge opening 118, the walls of which are closely adjacent the exterior surface of the terminal end 98 of member 96, thereby providing a substantially constricted annular discharge passage 120 through which gas, such as air, or vapor discharges at very high velocity as indicated diagrammatically by the arrows shown in FIG. 7.

The interior of insert 116 flares downwardly and slightly outwardly to facilitate expansion of the spray stream. As the annular stream of high velocity gas exits from passage 120, it shearingly intersects and decimates the annular stream of liquid discharging through passage 108, thereby forming a very finely atomized stream 122 of liquid and vapor particles, which are down to sub-micron in size range. The diverging nature of the interior of insert 116 permits the stream 122 rapidly to expand radially outward as well as moving at said velocity longitudinally through the scrubbing compartment 114 for purposes of being absorbed upon the contaminating particulate material within the incoming gases which are to be scrubbed. From FIG. 7 in particular, it also will be seen that the proportion of liquid to gas which is discharged by the nozzle embodiment shown in FIGS. 7 and 8 may be varied due to the adjustability of the head 106 relative to discharge opening 98 of the member 96.

Still another embodiment of nozzle structure is illustrated in FIGS 9–11 which is representative of a type wherein liquid is intersected and atomized in stages by a stream of gas, thereby being capable of high efficiency in the production of highly atomized vapor particles of very small, sub-micron size for example, induced to move at high velocity through the scrubbing compartment 14. Refering to FIG. 9 in particular, an inner conduit 124 arranged to conduct high pressure gas or vapor, is connected suitably to the interior conduit 28 shown in FIG. 1 for example. A coaxial outer sleeve 126 is suitably connected to the lower end of exterior conduit 30 shown in FIG. 1. A relatively complex nipple 128 which is exteriorly threaded adjacent opposite ends also has interior threads 130 immediately above a passage 132 through which air exits from 128. The upper threaded end of nipple 128 engages complementary threads in the lower end of outer sleeve 126 for connection thereto and the lower end of nipple 128 which is externally threaded receives the terminal nozzle member 134.

An internal diffusor 136 is clamped at its upper end in abutting relationship against the lower end of nipple 128 by means of the lower end 138 of said diffusor, which is of conical configuration, being engaged by a complementary inner surface 140 in the lower end of nozzle 134. Such engagement of surface 140 by the lower end 138 of the diffusor is effected incident to threading the nozzle 134 onto thel ower end of nipple 128.

The lower portion of nipple 128 is provided with a series of circumferentially spaced, axially extending, similar passages 142. Said passages respectively communicate with a similar series of circumferentially spaced passages 144 formed in the flanged upper portion of internal diffusor 136 as clearly shown in FIGS. 9 and 11, the latter being taken on the line 11—11 of FIG. 9. The coextending passages 142 and 144 transmit liquids from the annular space 146 between inner conduit 124 and outer sleeve 126 which continues into the annular space between said inner conduit 124 and the inner surface of the upper portion of nipple 128 as clearly shown in FIG. 9. Such liquid is discharged into the annular space 148 between the internal diffusor 136 and terminal nozzle 134 as shown in FIG. 9.

The internal diffusor 136 is provided with a central axial opening extending between the opposite ends thereof and having a plurality of different diameters and surface configurations as readily shown in FIG. 9. Intermediately of the ends of said diffusor, the central opening has a construction 150 which extends downwardly and outwardly nearly to the lower end of the diffusor, said lower end terminating in a more widely conical surface 152. Extending through the surface 152 is a series of discharge ports 154 which preferably are evenly spaced circumferentially and are substantially parallel to the lower end 138 of diffusor 136. Spaced a short distance above the circular row of discharge ports 154 is an intermediate row of circumferentially spaced discharge ports 156 which are directed at a slightly different angle to the axis of diffusor 136 than the ports 154. In addition, a circumferential row of upper discharge ports 158 are provided in the diffusor 136 so as to exit slightly below the constriction 150. The angle of the upper discharge ports 158 with respect to the axis of diffusor 136 preferably is still further different than the angles of the discharge ports 154 and 156 with respect thereto.

All of the discharge ports 154, 156 and 158 discharge relatively fine jets of liquid at different stages downwardly and inwardly toward each other and directly into the discharging stream of gas 160 which is moving at very high velocity downwardly through constriction 150 from which it rapidly expands in moving to the lower end of nozzle 134, thus shearingly engaging the discharging streams of liquid from ports 154, 156 and 158, thereby decimating and very finely atomizing the same as well as greatly accelerating the movement thereof. If desired, the ports 154, 156 and 158 may be staggered with respect to each other rather than being aligned as shown in FIG. 10. Further, the shape of the adjoining terminal surfaces of diffusor 136 and terminal nozzle 134 is such as to permit rapid and effective transverse expansion of the discharging stream of fog-like particles and vapor 162 for purposes of completely saturating the interior of scrubbing compartment 14 for purposes of enrobing particles of contaminating material entrained in the incoming stream of gas 12. This causes droplets of liquid to form in which said particles are nuclei, which particles subsequently are agglomerated to effectively remove the contaminating particles from the gas stream and permit the discharge of non-contaminated gas from the scrubbing apparatus.

While the invention has been described and illustrated in its several preferred embodiments, it should be understood that the invention is not to be limited to the precise details herein illustrated and described since the same may be carried out in other ways falling within the scope of the invention as claimed.

I claim:

1. A process of decontaminating a gas stream containing particulate matter of which a substantial portion is no greater than a micron in size, said process comprising the steps of introducing a stream of said contaminated gas into a confined path at a predetermined relatively slow speed, impinging a stream of gas of substantially less volume than said contaminated stream against a stream of liquid at pressures adequate to atomize the same and produce a spray of liquid particles of which the majority are not appreciably greater than micron in size and moving at velocities greatly in excess of that of said contaminated stream and within the range of approximately 30,000 ft. per minute to 50,000 ft. per minute, discharging said spray into said stream of contaminated gas in the same direction of movement thereof and substantially coaxially therein and thereby greatly accelerate said stream of contaminated gas and substantially completely permeating said stream and creating turbulence and diffusion therein to cause said finely atomized liquid particles to form liquid droplets around said solid contaminating particles as nuclei in said stream of gas while said stream is moving at a high velocity without any obstruction to the flow thereof, impinging said droplets while moving at high velocity against a smoothly curved surface extending laterally from said stream and thereby condense said droplets to produce a fluid stream of concentrated particulate contaminating matter and discharging the same from said stream of gas, and withdrawing the substantially decontaminated stream of gas away from said fluid stream of matter.

2. The process according to claim 1 in which the finely atomized liquid spray particles are produced by impinging steam at high pressures against said stream of liquid to form said spray.

3. The process according to claim 1 in which said stream of liquid is intercepted by said gas at a plurality of spaced locations to facilitate the atomizing thereof to form said spray.

4. The process according to claim 1 in which said stream of liquid is directed in a swirling path for interception by said stream of gas to form said spray.

5. The process according to claim 1 including the additional step of subjecting said decontaminated stream of gas to negative pressure adequate to substantially overcome the frictional losses therein while moving along said path of said stream of gas.

References Cited

UNITED STATES PATENTS

| 2,217,975 | 10/1940 | Waisner et al. | 239—427.5 |
| 2,935,375 | 5/1960 | Boucher | 55—257 |
| 3,015,127 | 1/1962 | Stalego | 239—427.5 |
| 3,212,235 | 10/1965 | Markant | 55—89 |

FOREIGN PATENTS

| 881,437 | 11/1961 | Great Britain. |
| 734,302 | 7/1955 | Great Britain. |
| 597,392 | 3/1956 | Canada. |

REUBEN FRIEDMAN, *Primary Examiner.*

SAMIH N. ZAHARNA, *Examiner.*

C. N. HART, *Assistant Examiner.*